US012047736B2

(12) United States Patent
Zhu

(10) Patent No.: US 12,047,736 B2
(45) Date of Patent: Jul. 23, 2024

(54) SPEAKER COVER ENABLING DIRECTIVITY CONTROL OF SOUNDWAVE RADIATION

(71) Applicant: Heng Zhu, Beijing (CN)

(72) Inventor: Heng Zhu, Beijing (CN)

( * ) Notice: Subject to any disclaimer, the term of this patent is extended or adjusted under 35 U.S.C. 154(b) by 0 days.

(21) Appl. No.: 17/103,869

(22) Filed: Nov. 24, 2020

(65) Prior Publication Data

US 2021/0160612 A1 May 27, 2021

(30) Foreign Application Priority Data

Nov. 27, 2019 (CN) ........................ 201911185399.4

(51) Int. Cl.
*H04R 1/34* (2006.01)
*H04R 1/28* (2006.01)

(52) U.S. Cl.
CPC ............ *H04R 1/345* (2013.01); *H04R 1/288* (2013.01)

(58) Field of Classification Search
CPC .......... H04R 1/34; H04R 1/345; H04R 1/288; H04R 1/30; G10K 11/26; G10K 11/28
USPC ................................................ 181/185–191
See application file for complete search history.

(56) References Cited

U.S. PATENT DOCUMENTS

| | | | | | |
|---|---|---|---|---|---|
| 4,706,295 | A * | 11/1987 | Putnam | G10K 11/025 381/184 | |
| 6,411,718 | B1 * | 6/2002 | Danley | H04R 1/26 181/144 | |
| 2002/0029926 | A1 * | 3/2002 | Vincenot | G10K 11/28 181/192 | |
| 2009/0178878 | A1 * | 7/2009 | Winker | H04R 1/345 181/151 | |

* cited by examiner

*Primary Examiner* — Kile O Blair

(57) ABSTRACT

A speaker cover enabling directivity control of soundwave radiation, containing a cover body having a truncated pyramid shape; the cover body is adapted to be provided with a speaker inside; the cover body is hollow, and is provided with an opening; the cover body has a base board and a plurality of side boards extending out from edges of the base board; a fixing unit is provided on the base board to fix the speaker; the side boards are made of hard board material; at least part of an inner side wall of each of the side boards is provided with sound absorption material.

7 Claims, 4 Drawing Sheets

SPEAKER COVER ENABLING DIRECTIVITY CONTROL OF SOUNDWAVE RADIATION

BACKGROUND OF THE INVENTION

The present invention relates to the field of sound reinforcement system, and more specifically relates to a speaker cover enabling directivity control of soundwave radiation.

Due to rapid developments in for example cultural, entertainment, media and conference industries, requirements for sound reinforcement in large venues (theaters, multi-function halls, conference rooms, broadcast rooms, concert halls, stadiums, open-air concert venues and outdoor performance venues) become gradually higher. However, there exists the following problems:

1. Poor room acoustic environment. Reverberation time is too long or there are obvious acoustic defects (such as echo, significantly delayed reflected sound, and sound focusing). As a result, even if horn speakers or a line array of speakers having stronger directivity control are used, sound with better clarity and quality cannot be obtained.

2. The use of an array of speakers will result in deteriorated sound quality compared with using a single speaker (for example, the sound quality of a line array of speakers and an array of speakers enabling linear directivity control cannot be compared with traditional constant directivity horn speakers).

3. Due to more "overflowing" sound energy at outdoor venues, the surrounding acoustic environment or other performances in adjacent venues will be affected.

BRIEF SUMMARY OF THE INVENTION

In view of the aforesaid disadvantages now present in the prior art, the present invention provides a speaker cover enabling directivity control of soundwave radiation, which may at least in a certain extent solve the problems of poor sound reinforcement effect now existing in the prior art.

The present invention is achieved as follows:

A speaker cover enabling directivity control of soundwave radiation, comprising a cover body having a truncated pyramid shape; the cover body is adapted to be provided with a speaker inside; the cover body is hollow, and is provided with an opening; the cover body comprises a base board and a plurality of side boards extending out from edges of the base board; a fixing unit is provided on the base board to fix the speaker; the side boards are made of hard board material; at least part of an inner side wall of part of the side boards is provided with sound absorption material.

Preferably, three to seven pieces of said side boards are preferably provided.

Preferably, the sound absorption material is sound absorption fiberglass.

Preferably, each of the side boards forms an included angle of 90 to 140 degrees with respect to the base board.

Preferably, the fixing unit comprises a mounting base panel fixed to the base board and a mounting cooperating panel fixed to the speaker; a plurality of grooves parallel to one another are provided on the mounting base panel; fitting ridges that fit into the grooves respectively are provided on the mounting cooperating panel.

Preferably, each of the grooves has a trapezoid cross section; a shorter one among an upper side and a bottom side of the trapezoid cross section defines a groove opening of the corresponding groove; each of the fitting ridges also has a trapezoid cross section which corresponds to the trapezoid cross section of the corresponding groove; a shorter one among an upper side and a bottom side of the trapezoid cross section of each of the fitting ridges is provided with an extended portion of a rectangular shape.

Preferably, the mounting base panel is fixed to the base board by bolts; the mounting cooperating panel is fixed to an outer shell of the speaker by bolts.

The present invention has the following advantageous effects: By placing the speaker inside the speaker cover, and by using the hard board material of the side boards, interference from other sources of sound can be prevented. Also, the soundwaves emitted from the speaker are radiated to a designated area, so that the surrounding acoustic environment will not be affected.

BRIEF DESCRIPTION OF THE DRAWINGS

In order to describe the technical solutions according to the embodiments of the present invention or the prior art, the figures necessary to be used in the description of the embodiments or of the prior art are briefly introduced below. Obviously, the figures mentioned in the description below are intended to illustrate only some of the embodiments of the present invention. A person skilled in the art should understand that other figures may be obtained based on the figures mentioned below so long as no inventive effort is involved.

In the figures: 1—cover body; 11—base board; 12—side boards; 13—opening; 2—mounting base panel; 21—grooves; 3—mounting cooperating panel; 31—fitting ridges.

DETAILED DESCRIPTION OF THE INVENTION

The technical solutions provided by the embodiments of the present invention will be clearly and thoroughly described below. Obviously, the embodiments described are not exclusive but only show some of all the possible embodiments of the present invention. Any other embodiments that may be obtained by a person skilled in this field of art without the need of any inventive effort based on the disclosure of the present invention should also fall within the scope of protection of the present invention.

In the present invention, technical terms such as "mounting", "joining", "connecting", and "fixing" should be broadly interpreted, unless otherwise specified. For example, connection may be intended as fixed connection, removable connection or connection as a one whole piece; and the connection may be mechanical or electrical, and may be achieved directly, or indirectly through a medium. Also, communication between two components may be intended as internal communication between the two components or may be generally intended as the cooperative relationship between the two components. A person skilled in this field of art may understand the specific meanings of these technical terms in the present invention based on the specific contexts where these technical terms are mentioned.

Figure 1:
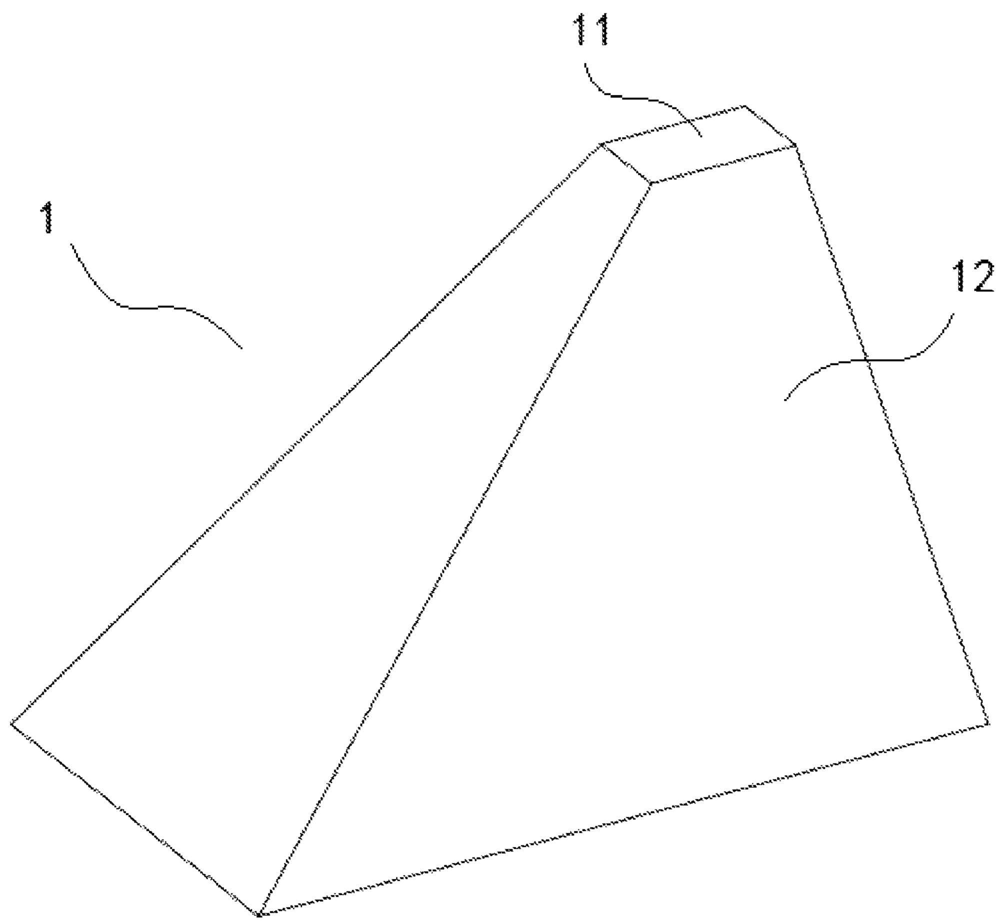
FIG. 1 is a schematic structural view of the speaker cover enabling directivity control of soundwave radiation according to the present invention.
Figure 2:
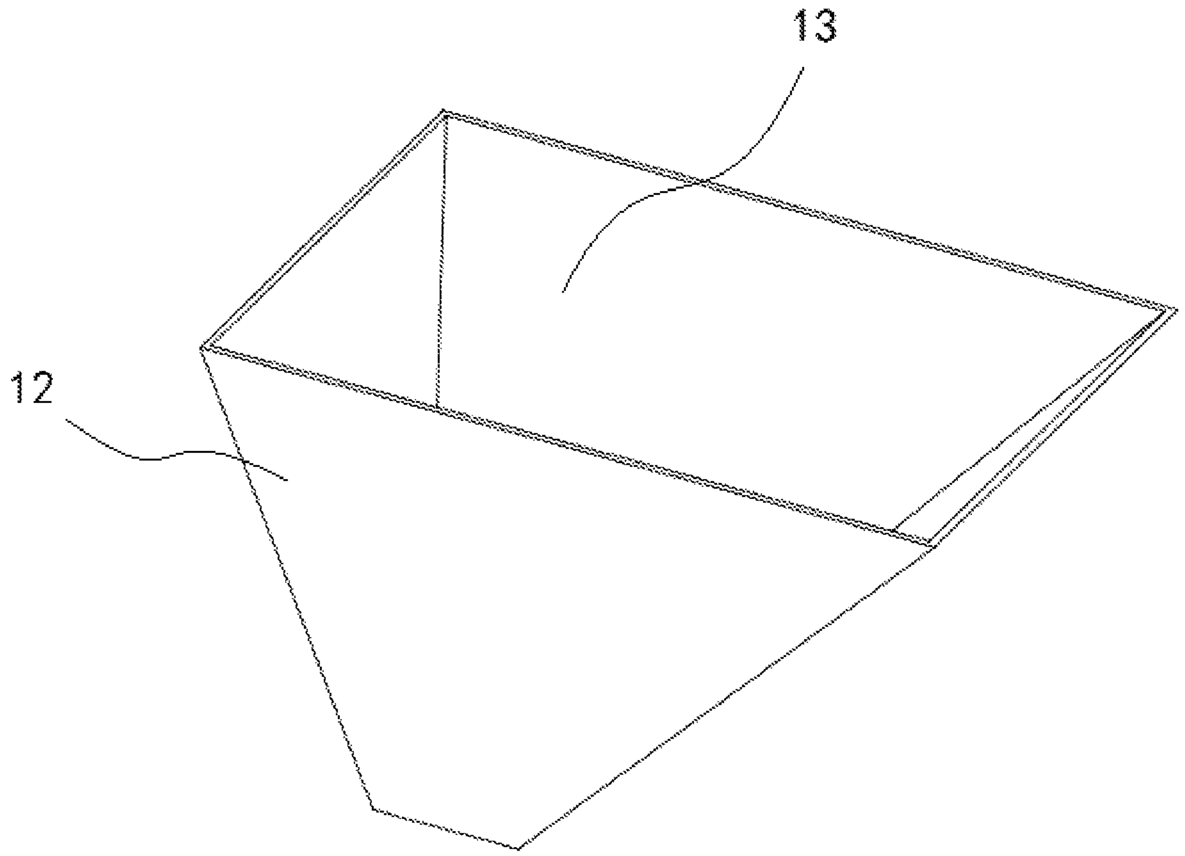
FIG. 2 another schematic structural view of the speaker cover enabling directivity control of soundwave radiation according to the present invention.

FIGS. 1-2 illustrate a speaker cover enabling directivity control of soundwave radiation, comprising a cover body 1 having a truncated pyramid shape; the cover body 1 is adapted to be provided with a speaker inside; the cover body 1 is hollow, and is provided with an opening 13; the cover body 1 comprises a base board 11 and a plurality of side boards 12 extending out from edges of the base board 11; a fixing unit is provided on the base board 11 to fix the speaker; the side boards 12 are made of hard board material; at least part of an inner side wall of each of the side boards 12 is provided with sound absorption material.

In actual use, the speaker cover of the present invention is applied to large and spacious venues such as theaters, multi-function halls, conference rooms, broadcast rooms, concert halls, stadiums, open-air concert venues and outdoor performance venues; the speaker cover can be concealed within a construction building, such as within the ceiling or wall of a theater. The speaker cover surrounds the speaker and radiates soundwaves of the speaker to a designated area, wherein the energy of the soundwaves of the speaker is drastically reduced by a reduction of sound pressure level of at least more than 20 dB outside the designated area. In some circumstances like when the auditorium of a theater is relatively large, a plurality of speaker covers according to the present invention may be used to serve different zones of the theater.

According to an embodiment, three to seven pieces of said side boards 12 are preferably provided; the soundwaves are emitted from the speaker at a zone of the speaker cover within an enclosure surrounded by the side boards 12; the emitted soundwaves hit the side boards 12 and deflect, such that the soundwaves are radiated with directivity to the designated area. The sound absorption material is sound absorption fiberglass. Each of the side boards 12 forms an included angle of 90 to 140 degrees with respect to the base board 11.

Figure 3:
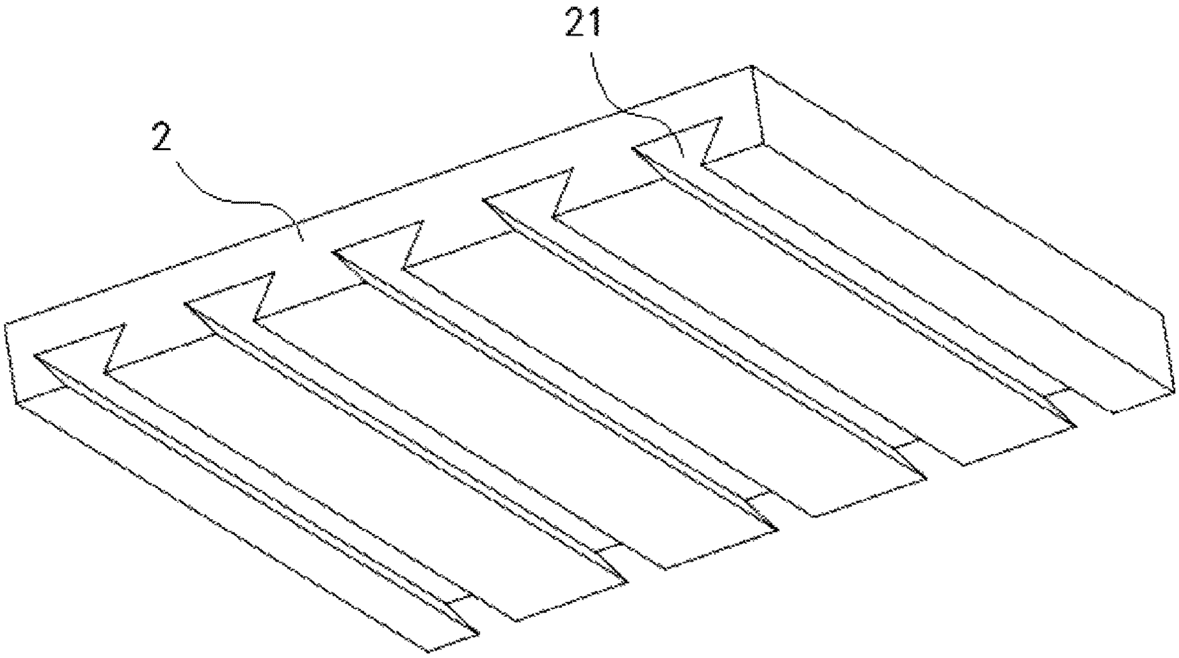
FIG. 3 is a schematic structural view of the mounting base panel.
Figure 4:
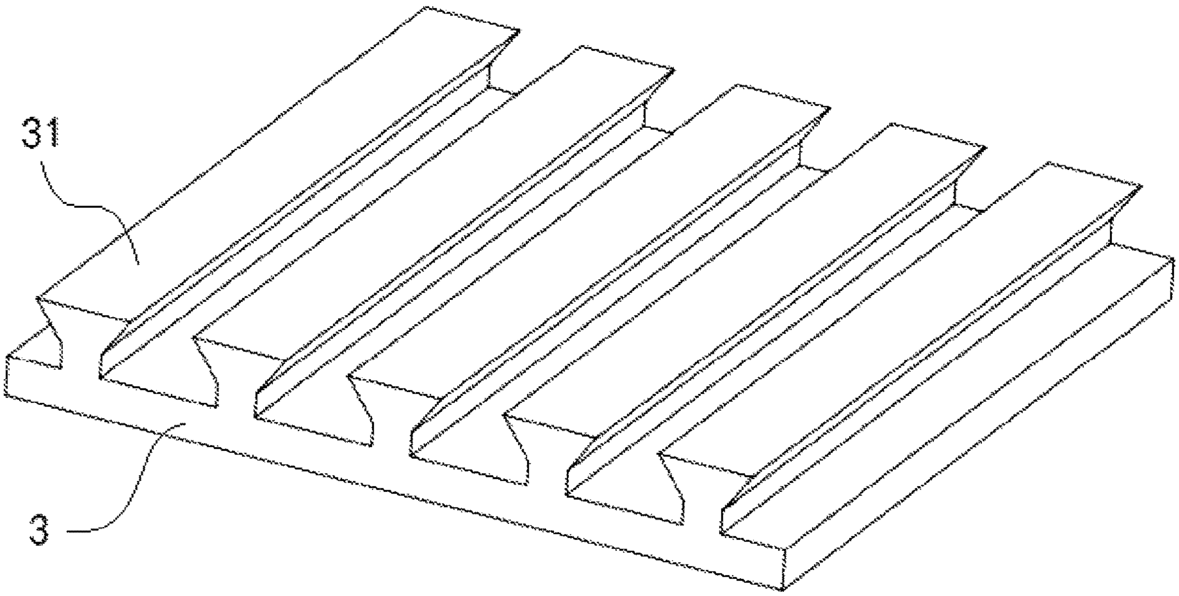
FIG. 4 is a schematic structural view of the mounting cooperating panel.
Figure 5:
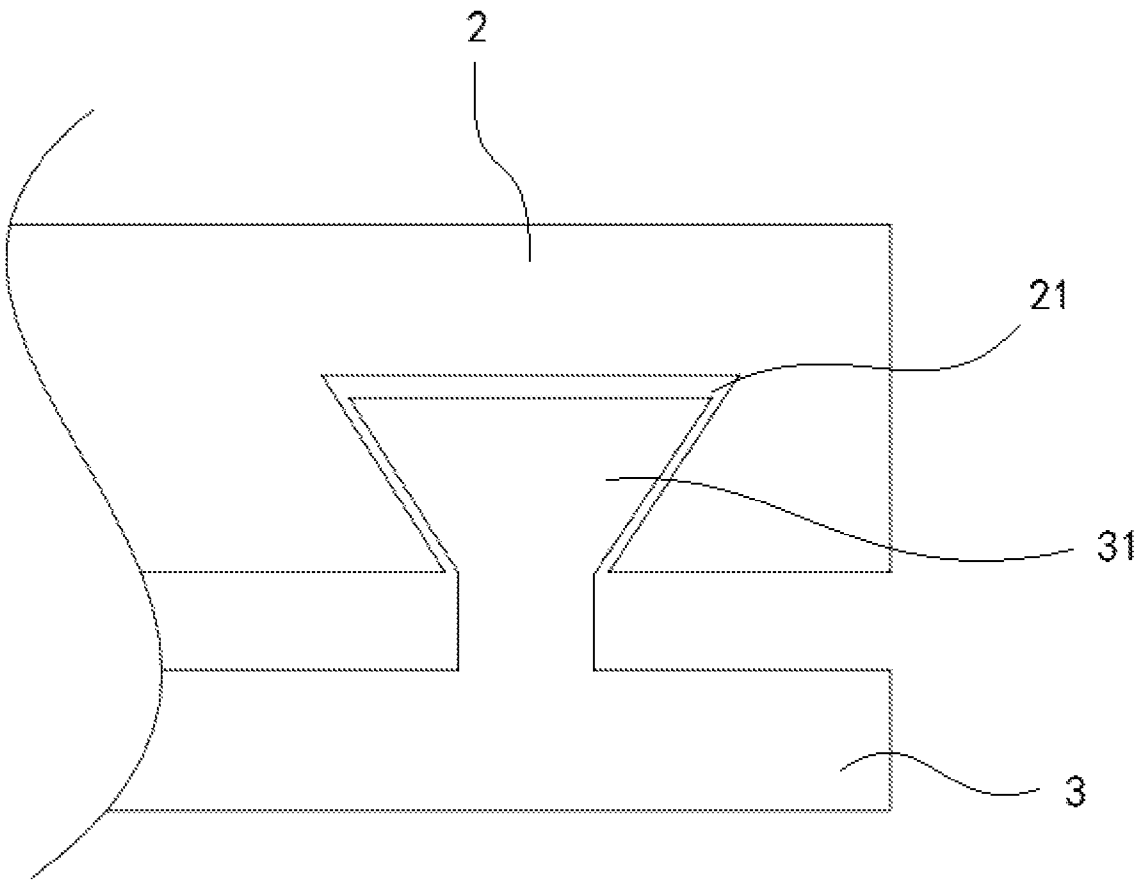
FIG. 5 is a schematic illustration showing the mounting base panel and the mounting cooperating panel fitted together.

FIGS. 3-5 disclose the fixing unit; the fixing unit comprises a mounting base panel 2 fixed to the base board 11 and a mounting cooperating panel 3 fixed to the speaker; a plurality of grooves 21 parallel to one another are provided on the mounting base panel 2; fitting ridges 31 that fit into the grooves 21 respectively are provided on the mounting cooperating panel 3. Specifically, each of the grooves 21 has a trapezoid cross section; a shorter one among an upper side and a bottom side of the trapezoid cross section defines a groove opening of the corresponding groove 21; each of the fitting ridges 31 also has a trapezoid cross section which corresponds to the trapezoid cross section of the corresponding groove 21; a shorter one among an upper side and a bottom side of the trapezoid cross section of each of the fitting ridges 31 is provided with an extended portion of a rectangular shape. The mounting base panel 2 is fixed to the base board 11 by bolts; the mounting cooperating panel 3 is fixed to an outer shell of the speaker by bolts. It should be understood that, the base board 11 and the side boards 12 may be removably connected. Further, an anti-falling security element, such as a rope, can be provided between the base panel 11 and the speaker connecting the base panel 11 and the speaker, so that the speaker will not fall off in case the fixing unit is damaged or cannot function properly.

Only the preferred embodiments are described above. The above described embodiments are not intended to limit the present invention. Any alterations, modifications and alternative configurations achieving the same technical effects etc. in accordance with the spirit and principle of the present invention, should also fall within the scope of protection of the present invention.

What is claimed is:

1. A speaker cover, comprising a cover body having a truncated pyramid shape; the cover body is adapted to be provided with a speaker inside; the cover body is hollow, and is provided with an opening; the cover body comprises a base board and a plurality of side boards extending out from edges of the base board; a fixing unit is provided on the base board to fix the speaker; the side boards are made of hard board material; the fixing unit comprises a mounting base panel fixed to the base board and a mounting cooperating panel fixed to the speaker; a plurality of grooves parallel to one another are provided on the mounting base panel; fitting ridges that fit into the grooves respectively are provided on the mounting cooperating panel.

2. The speaker cover of claim 1, wherein three to seven pieces of said side boards are provided.

3. The speaker cover of claim 2, wherein each of the side boards forms an included angle of 90 to 140 degrees with respect to the base board.

4. The speaker cover of claim 1, wherein at least part of an inner side wall of part of the side boards is provided with sound absorption material.

5. The speaker cover of claim 4, wherein the sound absorption material is sound absorption fiberglass.

6. The speaker cover of claim 1, wherein each of the grooves has a trapezoid cross section; a shorter one among an upper side and a bottom side of the trapezoid cross section defines a groove opening of the corresponding groove; each of the fitting ridges also has a trapezoid cross section which corresponds to the trapezoid cross section of the corresponding groove; a shorter one among an upper side and a bottom side of the trapezoid cross section of each of the fitting ridges is provided with an extended portion of a rectangular shape.

7. The speaker cover of claim 6, wherein the mounting base panel is fixed to the base board by bolts; the mounting cooperating panel is fixed to an outer shell of the speaker by bolts.

* * * * *